(12) United States Patent
Diab

(10) Patent No.: US 7,797,560 B2
(45) Date of Patent: Sep. 14, 2010

(54) SYSTEM AND METHOD FOR INTEGRATED TEMPERATURE MEASUREMENT IN POWER OVER ETHERNET APPLICATIONS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 548 days.

(21) Appl. No.: 11/782,320

(22) Filed: Jul. 24, 2007

(65) Prior Publication Data

US 2009/0027033 A1 Jan. 29, 2009

(51) Int. Cl.
*G06F 1/26* (2006.01)
*G06F 1/00* (2006.01)
*G06F 15/16* (2006.01)
*G06F 15/173* (2006.01)
*H04B 17/00* (2006.01)
*H04B 7/00* (2006.01)
*H03C 1/62* (2006.01)
*G01K 1/00* (2006.01)
*G01R 31/08* (2006.01)

(52) U.S. Cl. ............... 713/320; 713/300; 455/67.11; 455/115.1; 455/522; 709/230; 709/238; 702/130; 370/245

(58) Field of Classification Search ............... 713/300, 713/320; 455/67.11, 115.1, 522; 702/130; 709/230, 238; 370/245
See application file for complete search history.

(56) References Cited

U.S. PATENT DOCUMENTS

| | | | |
|---|---|---|---|
| 7,404,091 B1 * | 7/2008 | Gere | 713/300 |
| 7,554,783 B2 * | 6/2009 | Heath et al. | 361/93.1 |
| 7,593,747 B1 * | 9/2009 | Karam et al. | 455/522 |
| 2007/0296391 A1 * | 12/2007 | Bertin et al. | 323/303 |
| 2008/0052546 A1 * | 2/2008 | Schindler et al. | 713/300 |
| 2008/0311877 A1 * | 12/2008 | Darshan | 455/402 |

* cited by examiner

*Primary Examiner*—Stefan Stoynov
(74) *Attorney, Agent, or Firm*—Duane S. Kobayashi

(57) ABSTRACT

A system and method for integrated thermal monitoring in Power over Ethernet (PoE) applications. Headroom in a particular cable installation is identified using ambient temperature measurement alone or in combination with determined cable characteristics. In calculating an amount of headroom for a particular cable installation, the current capable of being carried over the cable would not be limited by worst-case cable assumptions.

17 Claims, 4 Drawing Sheets

SYSTEM AND METHOD FOR INTEGRATED TEMPERATURE MEASUREMENT IN POWER OVER ETHERNET APPLICATIONS

BACKGROUND

1. Field of the Invention

The present invention relates generally to power over Ethernet (PoE) systems and methods and, more particularly, to a system and method for integrated temperature measurement in PoE applications.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a power classification. In a conventional 802.3af allocation, each PD would initially be assigned a 15.4 W power classification after a Layer 1 discovery process. An optional classification process could then reclassify the PD to a lower power level. For example, a Layer 2 classification engine can be used to reclassify the PD. In general, a Layer 2 classification process can be included in PoE systems such as 802.3af, 802.3at or proprietary schemes. The completion of the power classification process enables the PSE to manage the power that is delivered to the various PDs connected to the PSE system.

In general, PoE is a relatively new application that is being applied to an existing cabling infrastructure. Significantly, this cabling infrastructure was not originally designed for the distribution of power. Accordingly, the provision of power over the cabling infrastructure can be impacted by the presence of heat, which reduces the capacity of the cable to transmit power and data.

Heat can be present due to a variety of sources. For example, heat can be present in the ambient environment or can be generated through the transmission of current in the cable itself or in surrounding cables. PoE systems must account for this heat during operation. These considerations will play an even greater role in the administration of high-power PoE systems such as that proposed by the IEEE 802.3at specification. What is needed therefore is a mechanism that enables the PoE system to account for the existence of heat in an active manner during system operation.

SUMMARY

A system and/or method for integrated temperature measurement in PoE applications, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
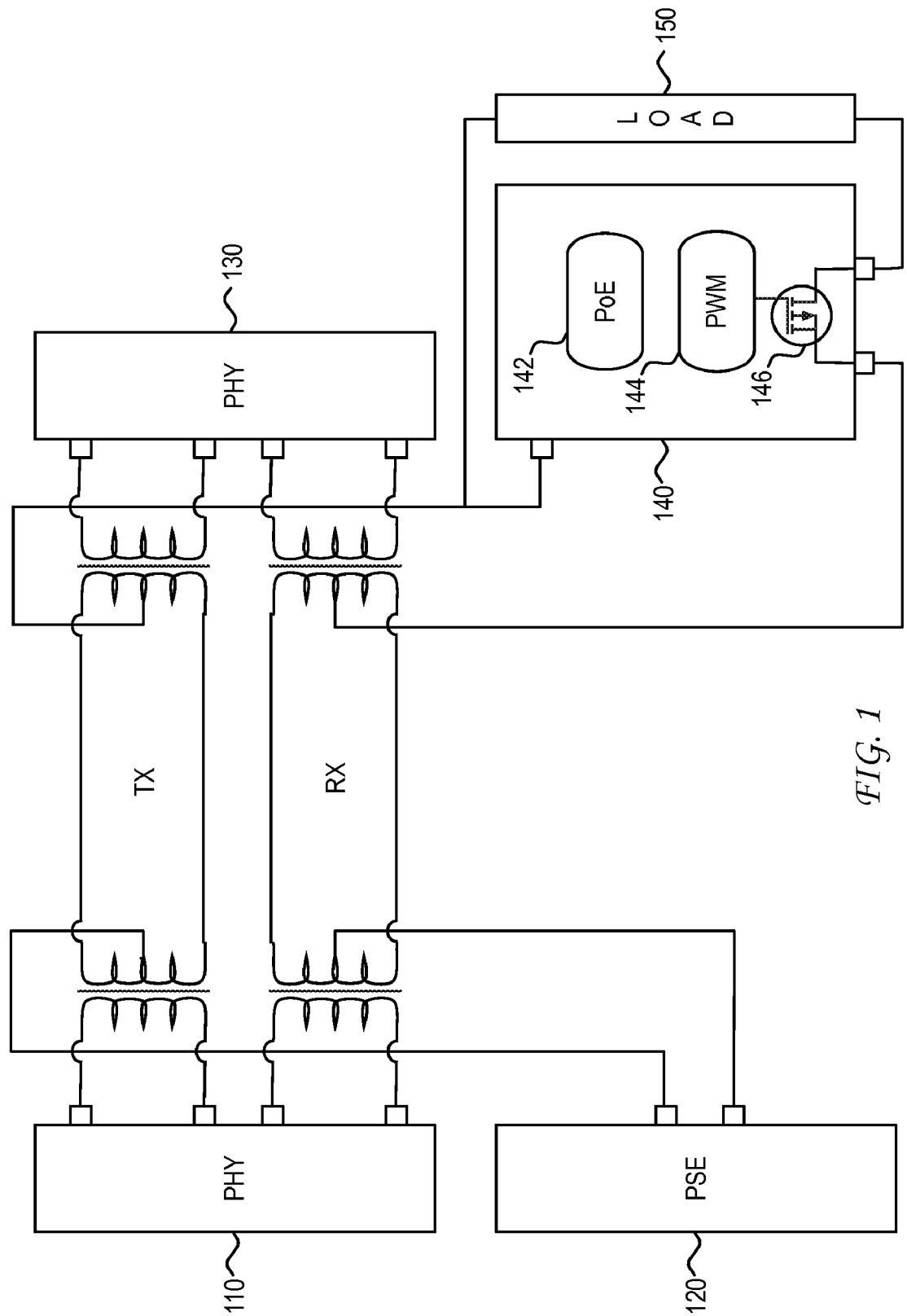
FIG. 1 illustrates an embodiment of a Power over Ethernet (PoE) system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power PoE+ solutions are often limited by the limitations of the cabling.

In the IEEE 802.3af standard, each wire conductor has a specified current limit of 175 mA, resulting in a total specified current limit of 350 mA. The 802.3at specification identifies higher wire conductor current limits to accommodate higher power applications. Regardless of the current limits that have been defined for a particular PoE application, one of the key considerations is heat.

Heat can greatly impact system performance. As the temperature goes up, cable attenuation also increases. For certain cable types, for example, cable attenuation can increase at a rate of 0.4% for every degree Celsius above 20° C. This can continue up to a typical cable temperature rating of 60° C. Heat can therefore have an impact on data transmission. As heat can also change the DC resistance of the cable, it also has an impact on the transmission of power over the cable. More generally, heat has a direct effect on safety and the long-term life expectancy of the cable itself.

In a PoE application, the net effect of the passage of current through the wire conductor is a temperature increase of the conductor itself. The heat generated by this temperature increase is then dissipated into the environment. This dissipated heat is in addition to the heat currently present as reflected by the ambient temperature. Further exacerbating the situation is the diverse environments in which the cable is placed. For example, increased heating can be experienced in areas where airflow is restricted, such as in a cable conduit, wiring closet, or the like. As typical installations include cables bundled together or in close proximity, temperature effects are typically magnified in areas where cable deployments are concentrated. For example, it is not uncommon to see massive bundles of cables (e.g., 90-150) leaving a data center or wiring closet.

One of the concerns of higher power PoE+ systems is the impact of overly conservative temperature restrictions that are derived from worst-case operating conditions. These overly conservative temperature restrictions can significantly reduce the legitimate operating margins of those PoE+ systems.

It is therefore a feature of the present invention that a measured ambient temperature can be integrated into a PoE application on a per port/channel basis to facilitate greater granularity in the PoE power allocation/management process. In general, one of the goals of a per port/channel ambient temperature integration is to ensure that an imposition of a current limitation or power consumption restriction on a port/channel is only performed when it is needed.

In conventional systems, there is typically no knowledge in the physical subsystem of the ambient temperature. Accordingly, control in the power allocation/management process would typically assume a worst-case cable operating temperature. This leads to overly broad restrictions.

Figure 2:
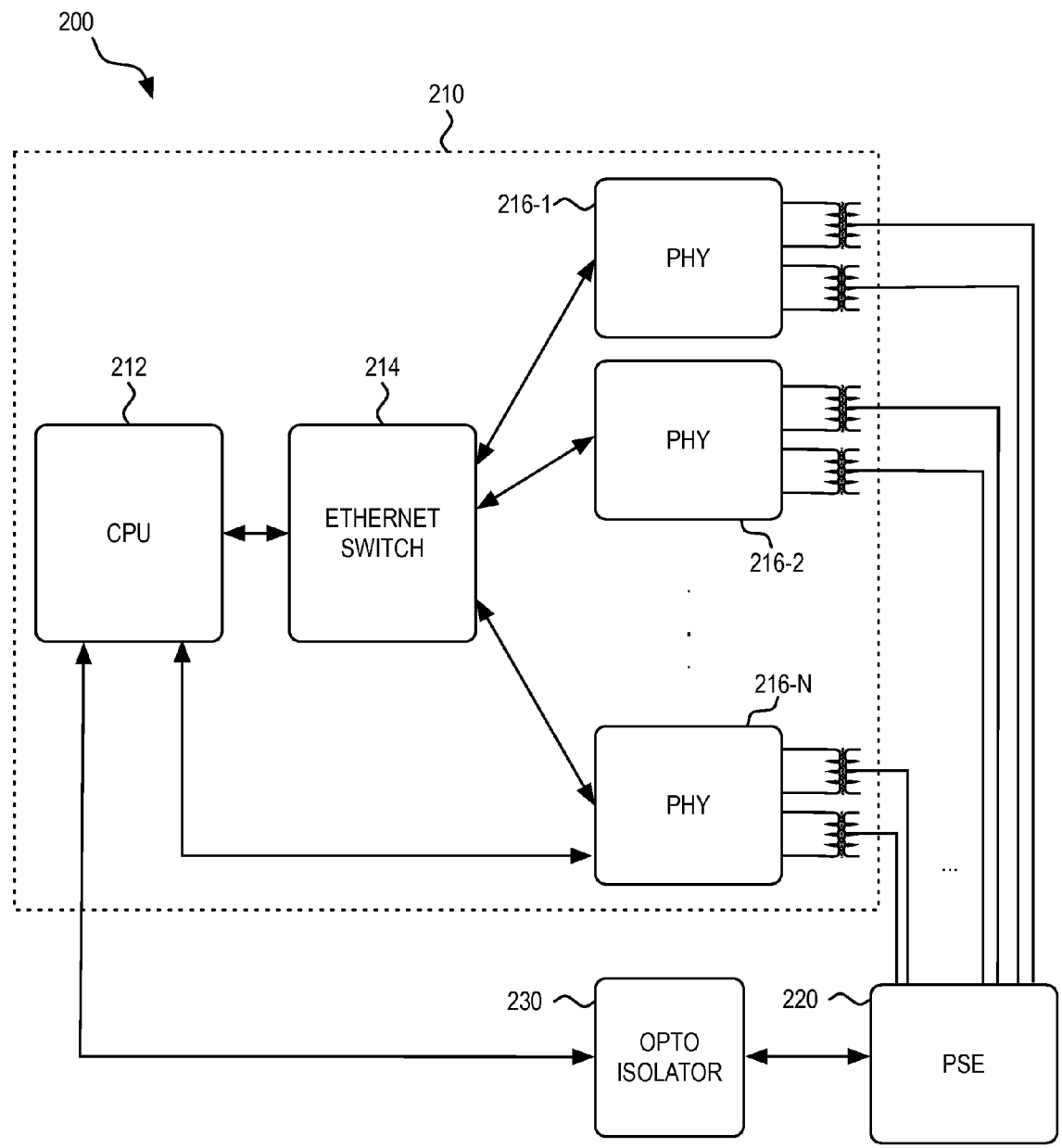
FIG. 2 illustrates an embodiment of a PoE environment at a power sourcing equipment.

FIG. 2 illustrates an embodiment of a PoE environment 200 at a PSE location in which the principles of the present invention can be implemented. As illustrated, environment 200 includes PHYs 216-1 to 216-N that are each connected to Ethernet switch 214. While a PHY can include one or more Ethernet transceivers, the wiring for only a single transceiver is illustrated as being connected to PHY 216-N. As would be appreciated, a PHY can be discrete or integrated as part of Ethernet switch 214. Each PHY is also connected to CPU 212, although only a single connection from CPU 212 to PHY 216-N is shown for simplicity. In one embodiment, CPU 212 is incorporated along with Ethernet switch 214 and PHYs 216-1 to 216-N on a single chip 210. In another embodiment, Ethernet switch 214 and PHYs 216-1 to 216-N are incorporated on a single chip separate from CPU 212, wherein communication with CPU 212 is enabled via a serial interface. Also illustrated in PoE environment 200 is a PSE 220 that provides power through the center taps of the transformers shown. As illustrated, PSE 220 is also coupled to CPU 212 via opto-isolator 230 that facilitates an isolation boundary.

Figure 3:
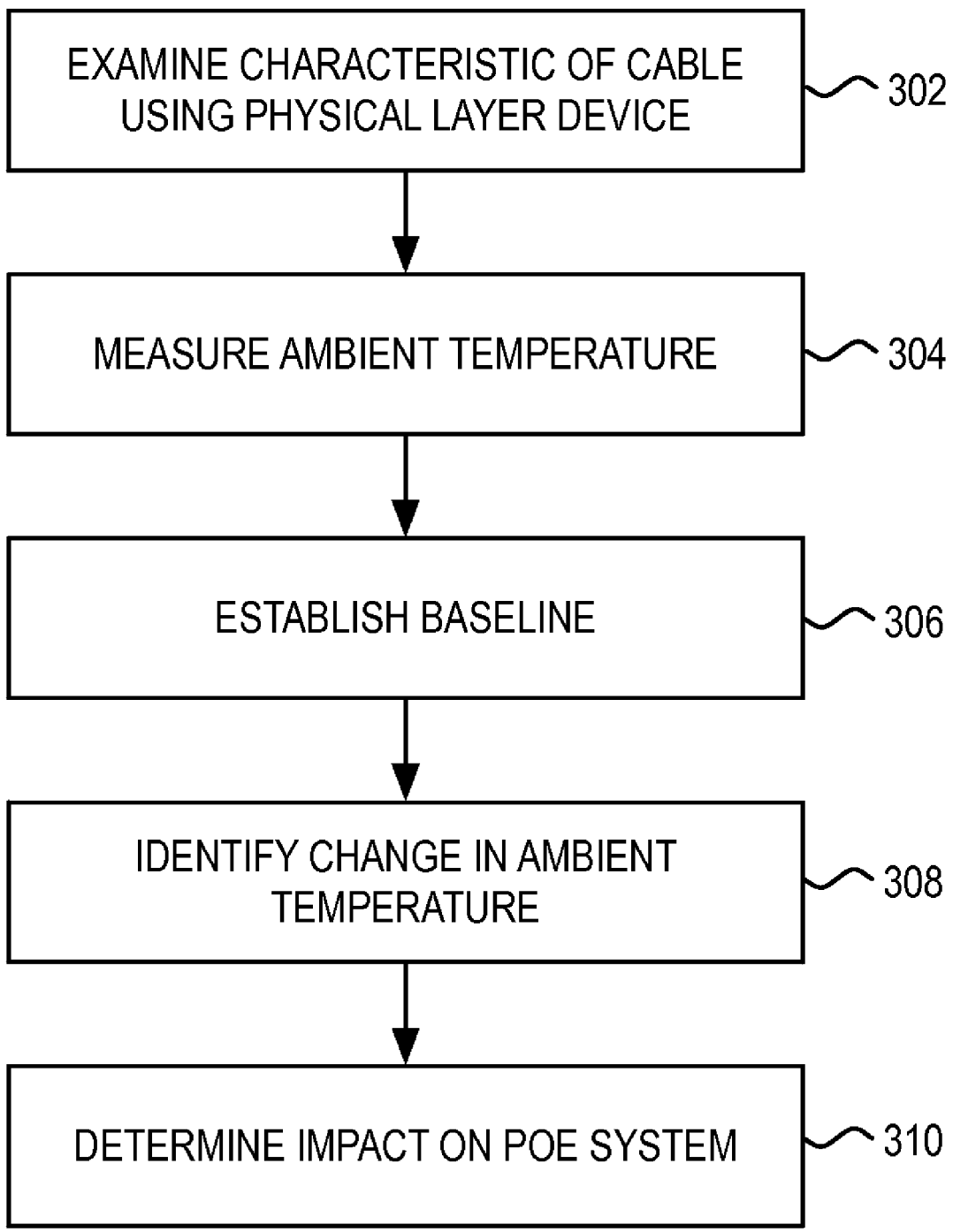
FIG. 3 illustrates a flowchart of a process of integrating ambient temperature measurements in a PoE process.

To illustrate the operation of PoE environment 200 in implementing the principles of the present invention, reference is now made to the flowchart of FIG. 3. As illustrated, the process begins at step 302, where one or more characteristics of a cable are examined using a physical layer device. In various examples, the examined cable characteristics can include the cable length, resistance, insertion loss, cross talk, etc. In one embodiment, these cable characteristics would be examined periodically during the provision of power on the particular PoE channel.

In one embodiment, a transceiver in PHY 230-N performs measurements of an Ethernet cable coupled to PHY 230-N. In one embodiment, measurements that enable a determination of cable length, resistance, insertion loss, cross talk, etc. can be taken during an echo canceller convergence process performed by an echo canceller module under control of CPU 210. Cable characteristic measurements taken by the transceiver are then transmitted to CPU 210. In an alternative embodiment, the cable characteristic measurements could also be taken by the Ethernet transceiver at the PD either alone or in combination with the transceiver in PHY 230-N.

At step 304, an ambient temperature is measured. In general, the ambient temperature can be measured using one or more temperature sensors that are associated with a PD and/or PSE subsystem. In various embodiments, the temperature sensor can be designed to take a temperature reading on or near a chip, inside a chassis, outside a chassis, inside an equipment room, or any other location that would enable measurement of an ambient temperature relevant to a cable. If the temperature sensor is on a chip or in a chassis, then an ambient temperature can be inferred.

At step 306, the ambient temperature, alone or in combination with the cable characteristics, can be used to determine a baseline reference point. In other words, the initial data that is obtained at steps 302 and 304 would enable the system to establish a reference point by which the system operation can be monitored and controlled in the future.

At step 308, a change in the ambient temperature is identified. This change in ambient temperature can be identified through the periodic monitoring of ambient temperature readings that are taken by one or more temperature sensors. As would be appreciated, the ambient temperature readings at the PSE or PD side of the system can be used, For example, an ambient temperature reading at the PD side can be used in an analysis at the PSE side, or vice versa.

At step 310, the identified change in the ambient temperature, alone or in combination with other cable characteristic data, can be used to determine a potential impact on the PoE system. In one embodiment, the determination is performed by CPU 210. In another embodiment, the determination is performed by PSE 220, which receives the measurements from CPU 212. Regardless of where the determination is performed, its availability to PSE 220 would enable PSE 220 to determine its impact on the PoE system configuration and/or operation.

In the process of step 310, the change in ambient temperature would be identified relative to the baseline reference point. This identified change can be used to recalibrate various aspects of PoE system operation. For example, an increase in ambient temperature Y from the baseline temperature reference point can lead to an inference that the DC cable resistance would increase by Y from the baseline DC cable resistance reference point. This identified increase in the DC cable resistance reference point can lead the system to determine that the transmission of power over the cable may need to be reduced or otherwise controlled in some fashion. As would be appreciated, the particular methodology by which an identified ambient temperature change would impact the PoE system operation would be implementation dependent.

In general, the PoE system impact analysis can be performed at the PSE and/or PD. For example, the analysis can be performed at the PSE using data that is generated at the PSE and/or PD. In another example, the analysis can be performed at the PD using data that is generated at the PSE and/or PD. If the data is generated remotely from the point of analysis, then the data communication can occur via a Layer 1 scheme, such as voltage and/or current modulation, Layer 2

(packets), Layer 3 (packets), or any such combination. Packets may be a standard protocol such as Ethernet, LLDP, OAM, or a proprietary system over these protocols.

In various embodiments, the potential impact can consider a change in operation of a single PoE channel, or a group of PoE channels. For example, if the determined change in temperature indicates that a given cable has reached a temperature that is above an allowable threshold (e.g., 60° C., 75° C., etc.), then the system can choose to reduce or cut the power being applied to that PoE channel. In another example, the system can choose to reduce or cut the power being applied to a group of PoE channels, if it is known that the heat in a given cable could impact the operation of other cables, for example, where the cables are bundled together.

Figure 4:
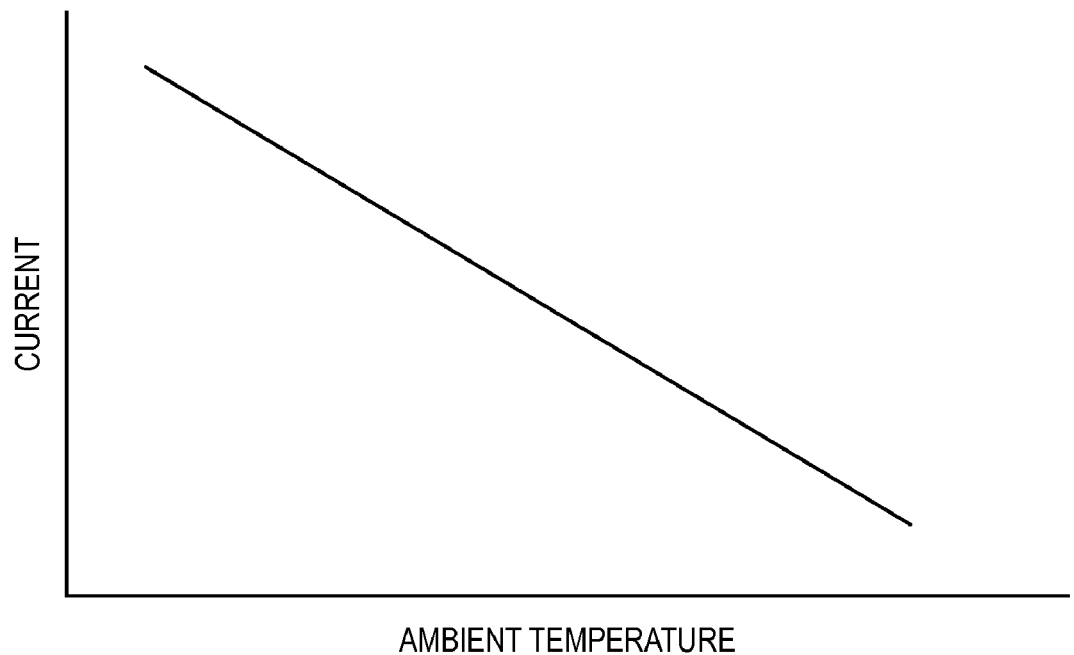
FIGS. 4 and 5 illustrate examples of current-temperature for a PoE cable installation.

As noted, one of the features of the present invention is that a measured ambient temperature can be integrated into a PoE application on a per port/channel basis to facilitate greater granularity in the PoE power allocation/management process. As illustrated in FIG. 4, the amount of current that can be carried over a cable can be related to an ambient temperature using a curve having a negative slope. In FIG. 4, the current-temperature curve is illustrated as a linear relationship for simplicity. This negative slope represents the impact of ambient temperature on the current carrying capacity of a cable as it approaches its cable rating (e.g., 60° C., etc.). With knowledge of such a relationship, the PSE/PD can be designed to control the amount of power that is transmitted/received over the cable based on the measured ambient temperature. As the ambient temperature increases, for example, the PSE/PD can be designed to reduce the amount of current that is transmitted/received over the cable.

Figure 5:
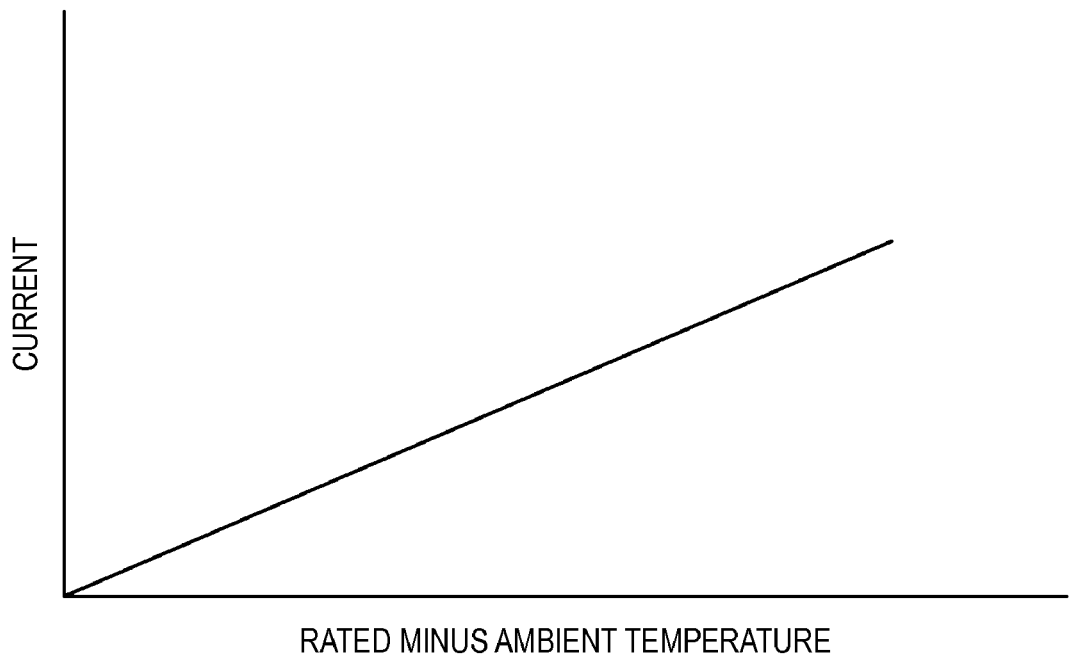

In one example, a derating curve based on the cable rating and the ambient temperature can be used to determine the current over the cable. FIG. 5 illustrates one example of a derating curve. In this example, the greater the difference between the cable rating and the ambient temperature, the greater the allowable current. In other words, the positive-slope derating curve (shown as a linear relationship for simplicity) enables greater levels of current over the cable if the temperature of the cable reflected by the ambient temperature is farther below the cable temperature rating. As would be appreciated, the particular shape of the curves illustrated in FIGS. 4 and 5 can be based on theoretical cable characteristics or actual cable characteristics.

In general, the use of the ambient temperature measurement enables the system to determine an amount of headroom remaining in the cabling for PoE current transmission. Without the ambient temperature measurement, the system would need to assume a conservative amount of headroom that is derived from a worst-case operating condition. Excess headroom in a particular cable installation would therefore be left unused.

In one embodiment, the ambient temperature measurement can also be combined with determined cable characteristics to produce a more accurate analysis of the headroom available for a particular cable installation. Here, knowledge of the ambient temperature can be used in combination with characteristics such as cable length, DC resistance, insertion loss, cross talk, etc. to determine the exact amount of current that can be sent through that cable. For example, if it is known that the cable connecting the PSE and PD is Cat 5 cable with a length of 60 m, then the system could determine that the DC resistance or insertion loss would be X at temp Y. The headroom present can then be deduced using the available temperature and cable characteristic information.

As would be appreciated, the particular mechanism by which the headroom would be determined would be implementation dependent. What is key, however, is that the information gained through temperature sensors positioned at one or more points would enable the system to more accurately calculate a cable temperature using various calibration schemes. Once a cable temperature is calculated, the system can then determine how much current to use for that particular cable installation. Significantly, this determination is based on the characteristics of that particular installation, not a worst-case scenario.

It should be noted that the principles of the present invention can be applied to any form of network cabling, whether standard Ethernet cabling (e.g., Category 3, 5, 6, etc.) or to non-standard cabling such as Type-II cabling.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system that provides power to a powered device, comprising:
    a powered device detection component that detects a presence of a powered device, said powered device coupled to a power sourcing equipment port via an Ethernet cable;
    a temperature sensor that measures an ambient temperature proximate to said power sourcing equipment; and
    a power controller that controls power allocation to said power sourcing equipment port based on said measured ambient temperature, wherein said power controller determines whether said powered device can be powered by said power sourcing equipment port based on a difference between said measured ambient temperature and a cable rating.

2. The power over Ethernet system of claim 1, wherein said temperature sensor takes measurements periodically.

3. The power over Ethernet system of claim 1, wherein said power controller lowers said power allocation based on said measured ambient temperature.

4. The power over Ethernet system of claim 1, wherein said power controller determines an allowable current on said power sourcing equipment port based on said measured ambient temperature.

5. The power over Ethernet system of claim 4, wherein said power controller determines an allowable current on said power sourcing equipment port based on a difference between said measured ambient temperature and a cable rating.

6. The power over Ethernet system of claim 1, wherein said power allocation is also based on measurements by a physical layer device.

7. The power over Ethernet system of claim 6, wherein said measurements by a physical layer device include a cable length.

8. The power over Ethernet system of claim 6, wherein said measurements by a physical layer device include a cable resistance.

9. The power over Ethernet system of claim 6, wherein said measurements by a physical layer device include an insertion loss or cross talk.

10. A power over Ethernet method, comprising:
- measuring a characteristic of an Ethernet cable by a physical layer device, said Ethernet cable coupling a power sourcing equipment to a powered device;
- measuring an ambient temperature at both said power sourcing equipment and said powered device; and
- controlling a power transmitted on said Ethernet cable based on said measured characteristic and said ambient temperature, at said power sourcing equipment and said powered device.

11. The method of claim 10, wherein said measuring a characteristic comprises measuring one of a cable length, resistance, insertion loss, and cross talk.

12. The method of claim 10, further comprising communicating said measured ambient temperature to said power sourcing equipment.

13. The method of claim 10, wherein said controlling comprises changing a current threshold.

14. The method of claim 10, wherein said controlling comprises changing a power consumption at said powered device.

15. A power over Ethernet method, comprising:
- measuring an ambient temperature at one of a power sourcing equipment and a powered device, said power sourcing equipment providing power to said powered device via an Ethernet cable; and
- reducing a current threshold used by said power sourcing equipment on said Ethernet cable based on said measured ambient temperature, wherein said reducing comprises reducing based on a comparison of said measured ambient temperature to a cable rating.

16. The method of claim 15, wherein said measuring comprises measuring at said power sourcing equipment.

17. The method of claim 15, wherein said measuring comprises measuring at said powered device.

* * * * *